United States Patent [19]

Koyama

[11] Patent Number: 5,326,635
[45] Date of Patent: Jul. 5, 1994

[54] MAGNETIC RECORDING MEDIUM HAVING A NON-MAGNETIC UNDERLAYER CONTAINING ELECTRICALLY CONDUCTIVE TIN OXIDE COATED PIGMENT

[75] Inventor: Noboru Koyama, Hino, Japan

[73] Assignee: Konica Corporation, Tokyo, Japan

[21] Appl. No.: 881,620

[22] Filed: May 12, 1992

[30] Foreign Application Priority Data

May 24, 1991 [JP] Japan .................. 3-149753

[51] Int. Cl.$^5$ ............................................. G11B 51/00
[52] U.S. Cl. .................................. 428/323; 428/328;
428/336; 428/403; 428/409; 428/900; 428/916;
283/904; 235/493
[58] Field of Search ............... 428/694, 900, 204, 916,
428/694 BB, 694 BS, 323, 328, 336, 403, 409;
283/904; 235/493

[56] References Cited

U.S. PATENT DOCUMENTS

| | | | |
|---|---|---|---|
| 3,215,554 | 1/1963 | Loots | 428/694 |
| 3,881,046 | 4/1975 | Akashi et al. | 428/216 |
| 4,310,599 | 1/1982 | Akashi et al. | 428/413 |
| 4,315,145 | 2/1982 | Nishikawa et al. | 435/493 |
| 4,511,616 | 4/1985 | Pitts et al. | 428/203 |
| 4,521,480 | 6/1985 | Fujiki | 428/328 |
| 4,528,240 | 7/1985 | Miyoshi et al. | 428/323 |
| 4,695,604 | 9/1987 | Amirsakis | 525/28 |
| 4,910,068 | 3/1990 | Takagi et al. | 428/141 |

FOREIGN PATENT DOCUMENTS

62-231426  7/1980  Japan .

*Primary Examiner*—Stevan A. Resan
*Attorney, Agent, or Firm*—Jordan B. Bierman

[57] ABSTRACT

Disclosed is a magnetic recording medium cassette which comprises a cassette case of storing a magnetic recording medium which comprises;
(a) a support; and provided thereon, in sequence
(b) at least one non-magnetic colored layer; and
(c) at least one magnetic layer wherein the specific surface resistance of the magnetic layer is not more than $1.0 \times 10^{10}$ Ω/square.

A magnetic recording medium according to this invention is improved the drop-out level and the running durability and a magnetic recording medium cassette can be discriminated whether it is a pirated edition or not.

9 Claims, 3 Drawing Sheets

MAGNETIC RECORDING MEDIUM HAVING A NON-MAGNETIC UNDERLAYER CONTAINING ELECTRICALLY CONDUCTIVE TIN OXIDE COATED PIGMENT

FIELD OF THE INVENTION

This invention relates to magnetic recording media including, for example, a magnetic tape and the cassettes for the same including, for example, a tape cassette.

BACKGROUND OF THE INVENTION

In recent years, the audio-visual age (that is so-called the AV age) has come and, accordingly, the demands for packaged visual media and the production thereof have been increased. In particular, a large quantity of blank video products and video products recorded music, motion pictures, animations and dramatic stages have been consumed every day as the commercial articles or the rental articles.

However, in the video industry where the video equipments are getting popularized, there are some people, who are not authorized by any lawful copyright owner, dub the contents of already recorded video softs in and they produce and sell a large quantity of the so-called pirated edition.

There have been strong requests in the video industry for forbidding any pirated edition to circulate. Accordingly, there are demands for technical means for forbidding the pirated editions to circulate so as to protect the benefits of the whole video industry.

The technical means for forbidding the pirated editions to circulate include, for example, a means in which a hologram (i.e., a seal) is utilized, another means in which a front cover so-called a lid covering the whole surface of a tape cassette is colored or a further means in which any dubbing is made impossible by applying a separate signal to an image signal.

In the above-given means, however, the pirated editions can not fully be forbidden, because any pirated edition producers can readily imitate. In addition, it costs more expensive and there may be some instances where the image quality of an original soft may be spoiled.

On the other hand, Japanese Patent Publication Open to Public Inspection (hereinafter referred to as JP OPI Publication) No.62-231426/1987 discloses a technique in which a magnetic layer is separated into two layers, the upper and lower layer, and a pigment or a dye is contained in the lower layer so that the lower layer can be discriminated by the color from the upper layer. This technique claims that the coating defects or coating unevenness on the upper layer can be discriminated by the colored contents of the lower layer. It is, however, not clear whether the discrimination can be made by the color of the lower layer for the purpose of forbidding the above-mentioned pirated edition. Further, in this patent publication, there is neither any indication nor suggestion of any technical idea that the lower layer is colored with the purpose of forbidding any pirated edition.

Still further, there may be some instances where the contrast of the upper layer may be deteriorated by mixing the color of a pigment or the like contained in the lower magnetic layer with the color (which is usually in dark-brown) of the magnetic powder of the same lower magnetic layer and, in addition, the electromagnetic conversion characteristics of the lower layer may be affected by a large amount of the pigment are contained in the magnetic layer. The above-mentioned cases fall similarly under the case of a medium having a light tightness provided by containing carbon black and so forth in a single-layered magnetic layer.

SUMMARY OF THE INVENTION

It is an object of the invention to provide a magnetic recording medium in which any imitation can hardly be made, also any pirated editions can effectively be forbidden so that any purchaser can readily discriminate the proper commercial products and, further, the specific surface resistance of the magnetic layer is so lowered as to improve the drop-out level and the running durability; and to provide the cassettes for the same magnetic recording media.

BRIEF DESCRIPTION OF THE DRAWINGS

Referring to the drawings, wherein like reference numerals designate like or corresponding parts throughout several views, as follows.

| | |
|---|---|
| 2 = Lower half | 3 = Upper half |
| 10 = Support | 11 = Non-magnetic colored layer |
| 12 = Magnetic layer | 13 = Direction (from the front) |
| 14 = Direction | 15 = Transparent conductive layer (from the rear) |
| 41 = Magnetic tape | 60 = Front cover (lid) |
| 71 = Video cassette | |

DETAILED DESCRIPTION OF THE INVENTION

To be more concrete, this invention relates to a magnetic recording medium comprising a support provided thereonto with at least one non-magnetic colored layer and at least one magnetic layer each arranged in this order, wherein the specific surface resistance of the magnetic layer is to be not higher than $1.0 \times 10^{10}$ $\Omega$/square.

At least one of the non-magnetic colored layers may contain a conductive pigment and, further, the surface of the conductive pigment may also be coated with tin oxide or antimony solid solution type tin oxide.

This invention also relates to the above-mentioned magnetic recording medium, wherein a transparent conductive layer is interposed between the support and the outermost surface of the magnetic layers and the specific surface resistance of the magnetic layer is to be not higher than $1.0 \times 10^{10}$ $\Omega$/square.

This invention further relates to a magnetic recording medium capable of magnetically recording a specific signal thereon and to a magnetic recording medium cassette comprising a cassette case capable of storing the magnetic recording medium, wherein the magnetic recording medium comprises a support provided thereonto with at least one non-magnetic colored layer and at least on magnetic layer each arranged in this order and the specific surface resistance of the magnetic layer is to be not higher than $1.0 \times 10^{10}$ Ω/square.

At least one of the non-magnetic colored layers may contain a conductive pigment and the surface of the conductive pigment may also be coated with tin oxide or antimony solid solution type tin oxide.

This invention further relates to the magnetic recording medium cassette, wherein a transparent conductive layer is interposed between the support and the outermost surface of the magnetic layers and the specific surface resistance of the magnetic layer is to be not higher than $1.0 \times 10^{10}$ Ω/square.

This invention still further relates to the magnetic recording medium cassette, wherein the non-magnetic colored layer is tinted in different color from that of the magnetic layer and the magnetic recording medium cassette can be discriminated whether it is pirated or not.

The magnetic recording medium cassettes of the invention include, for example, the cassettes for magnetic tapes such as those well-known for video recording use and, besides, the cassettes comprising each a flexible disk and a case so-called a shell for storing the disk.

The supports are preferred to be optically transparent. The expression, 'be optically transparent', means that a support is transparent to visible rays of light or another support capable of transmitting visible rays of light so as to discriminate the color of the inner layer even if the support is not completely transparent.

As is obvious from the later-described examples, the above-mentioned 'non-magnetic colored layer' may sometimes include a non-magnetic layer containing a white pigment or the like in a colorant or a non-magnetic white layer comprising a white pigment and a binder, as well as a non-magnetic layer containing at least a colorant having a specific color (such as a coloring pigment or dye) and a binder. In this case, the non-magnetic layer may comprise not only a single layer but also two or more layers. For example, it is allowed that a white layer is provided to the magnetic layer side and a coloring pigment layer may then be provided through the white layer.

EXAMPLES

The examples of the invention will now be detailed below.

Figure 1:
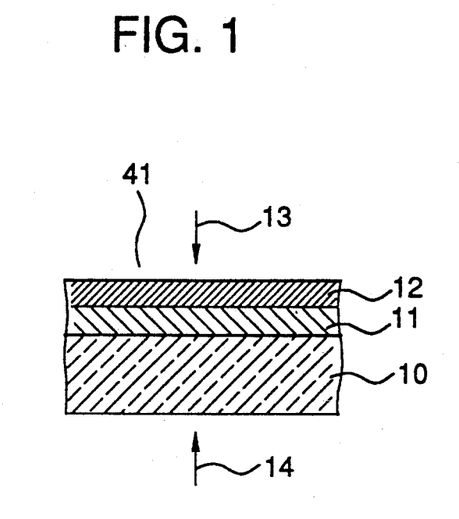
FIG. 1 illustrates the cross-sectional view of an example of the magnetic tapes relating to the invention.
Figure 2:
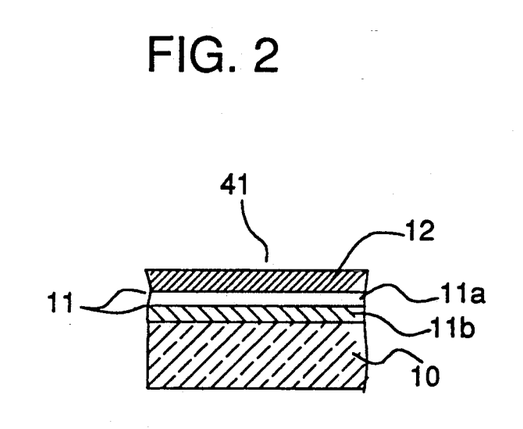
FIG. 2 illustrates the cross-sectional view of another example of the magnetic tapes relating to the invention.

FIGS. 1 and 2 illustrate the cross sectional views of each magnetic tape provided in accordance with each of No. 1 through No. 3 of the present invention.

In FIG. 1, tape 41 was laminated thereon with non-magnetic colored layer 11 and magnetic layer 12 in order on one side of the surface of transparent support (a base film) 10.

The ferromagnetic powder applied to magnetic layer 12 include, for example, Co-γ-$Fe_2O_3$, Co-containing $Fe_3O_4$, ferromagnetic metal powder (such as those of Fe and Fe-Al types), hexagonal system ferrite and, besides, those given in JP OPI Publication No.2-173931/1990, p. 3, 11th line of the lower left column to 7th line of the lower right column.

Magnetic layer is allowed to contain a lubricant [including, for example, silicone oil, graphite, molybdenum disulfide, tungsten disulfide, a monobasic aliphatic acid having 12 to 20 carbon atoms (such as stearic acid) and an aliphatic acid ester having 13 to 40 carbon atoms; an abrasive (such as α-$Al_2O_3$), an antistatic agent (such as carbon black and graphite) and a dispersant (such as powdered lecithin).

The binders applicable to magnetic layer 12 and non-magnetic colored layer 11 include, for example, a vinyl chloride type resin, a polyurethane type resin, the resins modified with a polar group such as those of a sulfonic acid salt and, besides, those given in JP OPI Publication No. 2-154320/1990, p. 3, 2nd line of the upper right column to p. 4, 16th line of the lower right column.

Non-magnetic colored layer 11 contains the above-given binders and, besides, a conductive pigment. The conductive pigments include, for example, metal particles such as those of silver powder, silver nitrate, an organic silver compound and copper powder; and metal oxide pigments such as zinc oxide, barium sulfate and titanium oxide each coated with a conductive material such as a tin oxide layer or an antimony solid solution type tin oxide layer. Among them, it is preferred to use the pigments coated with the above-given conductive materials, from the viewpoint of expressing various color tones.

The above-mentioned conductive pigment(s) coated with tin oxide or antimony solid solution type tin oxide<hereinafter referred to as 'tin oxide coated pigment(s)'> do not spoil any of the inherent color tones of the pigment(s), because the layers thereof are transparent.

In addition to the above-given conductive pigments, it is allowed to further add any well-known pigments and/or dyes. The examples of the well-known pigments applicable thereto may be given below. Namely, inorganic pigments including white pigments such as alumina and titanium oxide, green pigments such as chromium oxide, yellow pigments such as chromium yellow and titanium oxide and red pigments such as iron oxide red; and organic pigments including azo type pigments, triphenylmethane type pigments, quinoline type pigments, anthraquinone type pigments and phthalocyanine type pigments. The above-given pigments and the conductive pigments are to have a particle size within the range of, desirably, 0.1 to 10 μm and, preferably, 0.1 to 2 μm.

The dyes include, for example, a phthalocyanine dye, an azo dye, an anthraquinone dye, an indigoid dye, a nitro and nitroso dye, a quinoline dye, a methine dye, a thiazole dye, a quinoneimine dye, an azine dye, an oxazine dye, a thiazine dye, an azoic dye, a diphenylmethane dye, a triphenylmethane dye, a xanthene dye, an acridine dye, an oxide dye, a sulfide dye, a phthaleine dye, an aminoketone dye and an oxiketone dye.

From the viewpoint of controlling the specific surface resistance within the scope of the invention, it is desirable to be limited to add the above-given pigments and dyes in a proportion of not more than 50% by weight and, preferably, not more than 30% by weight of the conductive pigments used.

The specific surface resistance is so controlled as to be not higher than $1.0 \times 10^{10}$ Ω/square, desirably, not higher than $5.0 \times 10^9$ Ω/square and, preferably, $1.0 \times 10^9$ Ω/square. When a specific surface resistance exceeds $1.0 \times 10^{10}$ Ω/square, the drop-out and running durability are deteriorated. The controls thereof can be performed by suitably varying each of the factors such as the kinds of conductive pigments, the thicknesses of the non-magnetic colored layer containing the conductive pigment and the thicknesses of the magnetic layer.

It is allowed to divert the solvents for preparing the solutions for the above-mentioned magnetic layer to the purpose of dissolving or dispersing the above-mentioned conductive pigments, and they include, for example, cyclohexanone, methylethyl ketone, toluene, acetone and those given in JP OPI Publication No.1-159828/1989, p. 8, lines 1 to 16 of the upper right column.

In non-magnetic colored layer 11, the content of the pigment or dye is advisable to be in a proportion within the range of, desirably, 100 to 10000 parts by weight and, preferably, 300 to 3000 parts by weight to 100 parts by weight of the binders used therein.

The thickness of the same layer 11 is to be within the range of, desirably, 0.1 to 10 μm and, preferably, 0.5 to 6 μm.

Support 10 is preferable to be transparent. The materials for them include, for example; polyesters such as polyethylene terephthalate and polyethylene-2, 6-naphthalate; polyolefins such as polypropylene; cellulose derivatives such as cellulose triacetate and cellulose diacetate; and plastics such as polyamide and polycarbonate. Besides the above, it is also allowed to use metals such as Cu, Al and Zn; glass; boron nitride; and ceramics such as Si-carbide; each as the materials thereof.

The thickness of support 10 may be of the order within the range of 3 to 100 μm approximately and, preferably, 5 to 50 μm.

The methods for forming non-magnetic colored layer 11 and magnetic layer 12 on support 10 include, for example, a method in which the former layer is coated and dried and the latter layer is then laminated thereon (that is the so-called wet-on-dry coating method); and another method in which, while a layer is remaining wet and undried, the successive layers are laminated at the same time or one after another (that is the so-called wet-on-wet coating method or wet multilayer coating method). From the viewpoints of layer adhesion properties and surface characteristics, it is advisable to carry out a simultaneous multilayer coating in a wet-on-wet multilayer coating method. It is also advisable to add an isocyanate type hardener in the solutions for magnetic layers. However, there may also be some instances where such a hardener would be better to be added into the paints for the non-magnetic layers.

When magnetic tape 41 is constituted as mentioned above, the color (that is usually dark-brown) of magnetic layer 12 can be seen from side 13 of magnetic layer 12 and the color (that is usually white) of non-magnetic colored layer 11 can be seen through transparent support 10 from the inverse direction 14.

In the case where non-magnetic colored layer 11 is so formed as to contain both white pigment and chromatic color pigment, the color (that is usually dark-brown) of magnetic layer 12 cannot be seen or can hardly be seen from the direction 14 because of the content of the white pigment. Therefore, magnetic layer 12 can clearly be discriminated and recognized by the color of non-magnetic colored layer 11. In this case, the color of non-magnetic colored layer 11 may be pastel shaded by mixing the colorant pigment with white.

In the case where the above-described tape 41 is constituted and stored in a tape cassette as mentioned later and a recording is made on such a tape as shown in FIG. 1 for forbidding any pirated editions and, when the recording is dubbed into other tapes than that mentioned above, it can readily be discriminated whether the dubbed tapes are pirated or not by checking up whether the colors are the same with or the different from each other when seeing the colors from the above-mentioned directions 13 and 14. In other words, it the dubbed tapes are pirated, the same colors are seen from both directions 13 and 14, because any non-magnetic colored layer 11 is not provided thereto.

It is very difficult to manufacture the tape shown in FIG. 1, which is applicable to the invention, even if any pirated edition manufacturers tried to process a raw tape so as to produce an imitation. Therefore, any imitation can be forbidden and, in addition, any tape manufacturers can also provide their own colors to their tapes upon selecting from the above-mentioned colors.

Particularly different from the tape cassettes of which the case bodies are to be processed, the tapes themselves stored in the cassette bodies are so processed as to have a discriminative function. Therefore, every imitator should process their video tapes in themselves.

In the above-described tapes (as same as in the later-mentioned tapes), it is preferred to make the difference of the colors within the following range. To be more concrete, the color of tape 41 is measured by a color analyzer (Model CMS-1200 manufactured by Murakami Chromatic Co.) from the upper surface 13 of a subject tape and the rear surface 14 thereof and $L^*$, $a^*$ and $b^*$ are each so obtained as to calculate the color difference $\Delta E^*$ [which is shown in Color Specification System: CIELAB, recommended in 1976 by CIE (standing for Commission Internationale de l'Eclairage)]. It is advisable to set the color difference $\Delta E^*$ between the rear side 14 of the subject tape and the front side 13 thereof (namely, $\Delta E^*$ on the rear surface $-\Delta E^*$ on the front surface) to be not less than 5.0, desirably not less than 10.0 and, preferably not more than 100.0.

According to the tape shown in FIG. 1, non-magnetic layer 11 is separated from magnetic layer 12. Therefore, the contrast thereof comes out excellently and the electromagnetic conversion characteristics of magnetic layer 12 are not affected, as compared to the case where a pigment or the like is added into magnetic layer 12. Particularly, a conductive pigment is contained in non-magnetic colored layer 11. Therefore, the specific surface resistance of magnetic layer 12 is not higher than $1.0 \times 10^{10}$ Ω/square and the drop-out level and the running durability are also improved. Further, non-magnetic colored layer 11 is not exposed to the outer surface. Therefore, the layer 11 cannot be peeled off by friction with the tape running system. In addition, the layer 11 is interposed between magnetic layer 12 and support 10. Therefore, a sublayer-like effect can also be displayed and the adhesion strength of magnetic layer 12 can also be improved.

FIG. 2 shows an example of the other tapes, wherein non-magnetic colored layer 11 was separated into two layers, namely, a white pigment layer as the upper layer 11a and the chromatic color layer as the lower layer 11b. In the case where two or more non-magnetic colored layers are formed, at least one of the layers is preferable to contain the above-mentioned conductive pigment. When this is the case, the specific surface resistance of magnetic layer 12 can readily be so controlled as to be not higher than $1.0 \times 10^{10}$ Ω/square.

In the tapes each so constituted as above as to have the multilayered non-magnetic colored layers, the color of chromatic color pigment layer 11b can be more emphasized by white pigment layer 11a and the influence of the color of magnetic layer 12 can fully be prevented, so that the contrast to the color of magnetic layer 12 can also be more excellent. In such a case as shown in FIG. 2, it is also allowed to provide a color in advance to a support in itself without making use of any colored layer 11b.

In the layers 11a and 11b, each of the contents of the pigments is preferably within the range of 400 to 3000 parts by weight to 100 parts by weight of the binders used. The thickness of each layer is desirably within the range of 0.5 to 4.0 μm. Besides the above-mentioned constitution, it is allowed that each layer may be combined with other different pigment layers.

Figure 3:
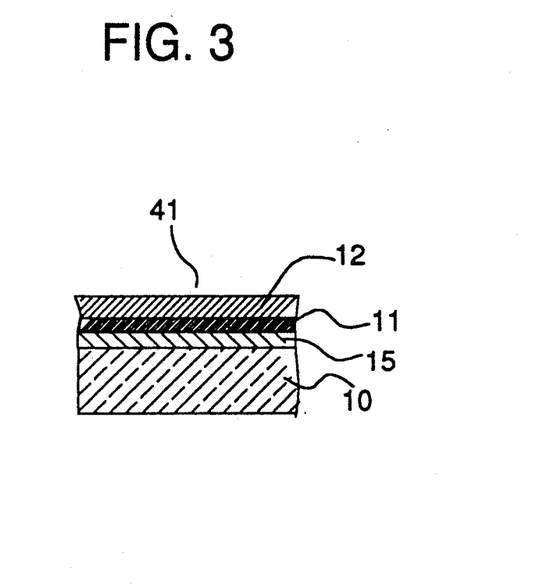
FIG. 3 illustrates the cross-sectional view of a further example of the magnetic tapes relating to the invention.

FIG. 3 shows the cross-sectional view of a magnetic tape embodied in this invention No. 4, wherein magnetic tape 41 was comprised of support 10 laminated on one side thereof with transparent conductive layer 15, non-magnetic colored layer 11 and magnetic layer 12 in this order.

The magnetic powders, binders and additives each constituting magnetic layer 12, the dyes, pigments (which may not necessarily be conductive pigments) and binders each constituting non-magnetic colored layer 11, the kinds of support 10, the amounts of every composition compounded, the layer laminating methods and the colorimeteries of the resulting tapes; the every one of the above-mentioned factors can be in conformity with those of the above-given example.

Now, the example of the formation of the above-described transparent conductive layer 15 will be given below.

Transparent conductive layer (1)

The surface of support 10 was activated by applying thereto a glow-discharge (at a discharge output of 750w for one second) in an oxygen atmosphere having a vacuum level of $3 \times 10^{-12}$ Torr and tin was then vacuum-evaporated in an oxygen atmosphere having a vacuum level of $5 \times 10^{-4}$ Torr, (at a vacuum-evaporation temperature of 1200° C. and a layer thickness of 100Å.

Transparent conductive layer (2)

The following boron oxide-containing tin oxide hetero-condensed polymer was diluted with a solvent (i.e., toluene) at a proportion of 1:1 and the resulting solution was coated over support 10 (so as to have a dried layer thickness of 0.5 μm).

The polymer synthesizing method is disclosed in WO90/13851 Publication. When a part of tin atoms is substituted by boron atoms, the conductivity can be more improved.

Transparent conductive layer (3)

The coating solution having the following composition was prepared by making use of 14 kinds of the charge-transfer type bonds each consisting of a boron atom pair-containing polymer and a basic nitrogen atom-containing compound (hereinafter referred to as boron polymers), which are disclosed in JP OPI Publication No. 1-266153/1989, pp. 8∼11 and the resulting coating solution was coated over support 10 (so as to have a layer thickness of 1.0 μm).

| | |
|---|---|
| Boron polymer (Hi-Boron CTN-131, produced by Boron International Co.)* | 10 parts by weight |
| Polyurethane resin | 100 parts by weight |
| Methylethyl ketone | 100 parts by weight |
| Toluene | 100 parts by weight |

*The boron polymer was given by (6) in the foregoing JP OPI Publication, p.9, and other 13 kinds of boron polymers were also treated in the same manner.

The examples of the boron polymers will be given below.

The thickness of transparent conductive layer 15 is to be within the range of, desirably, 0.1 to 5.0 μm and, preferably, 0.1 to 3.0 μm, from the viewpoint that the specific surface resistance can be not higher than $1.0 \times 10^{10}$ Ω/square.

When magnetic tape 41 was constituted as described above, the color (usually in dark-brown) of magnetic layer 12 can be seen from the side 13 of magnetic layer 12 and the color (white, for example) of non-magnetic colored layer 11 can be seen through transparent support 10 and transparent conductive layer 15 from the inverse direction 14.

When the transparent conductive layer 15 is arranged adjacently to support 10 as shown in this example, the layer 15 can display the effects as the tape for forbidding the pirated editions, because of its own peculiar transparency characteristics. However, the specific surface resistance can be more effectively lowered by interposing the transparent conductive layer 15 between magnetic layer 12 and non-magnetic colored layer 11 or by interposing it between the outermost magnetic layer and the next underneath magnetic layer in the case where magnetic layer 12 is consisting of multiple layers. Besides the above cases, the scope of the invention also includes the cases where transparent conductive layer 15 is sandwiched among a magnetic layer, a non-magnetic colored layer and a support.

Figure 4:
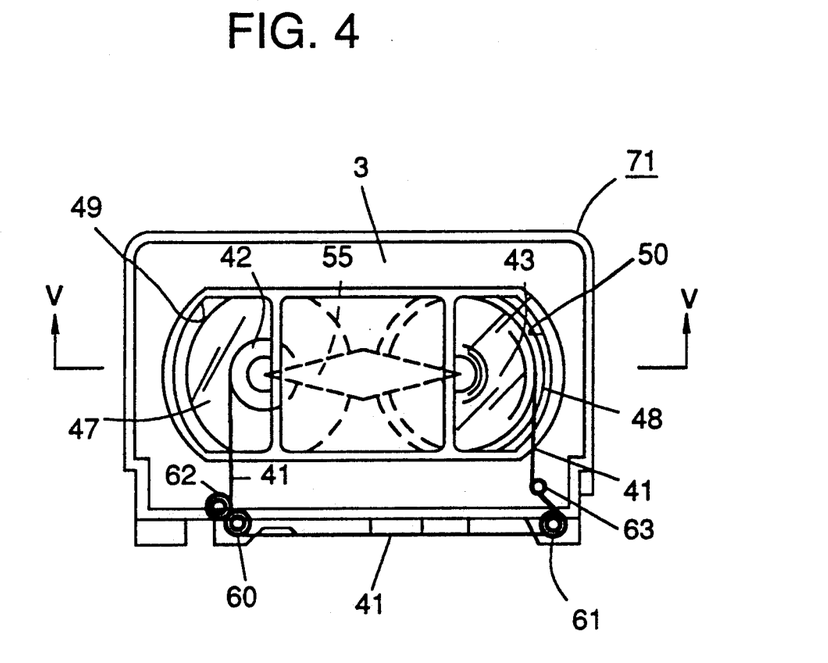
FIG. 4 illustrates the top plan view of a video tape cassette relating to the invention.
Figure 5:
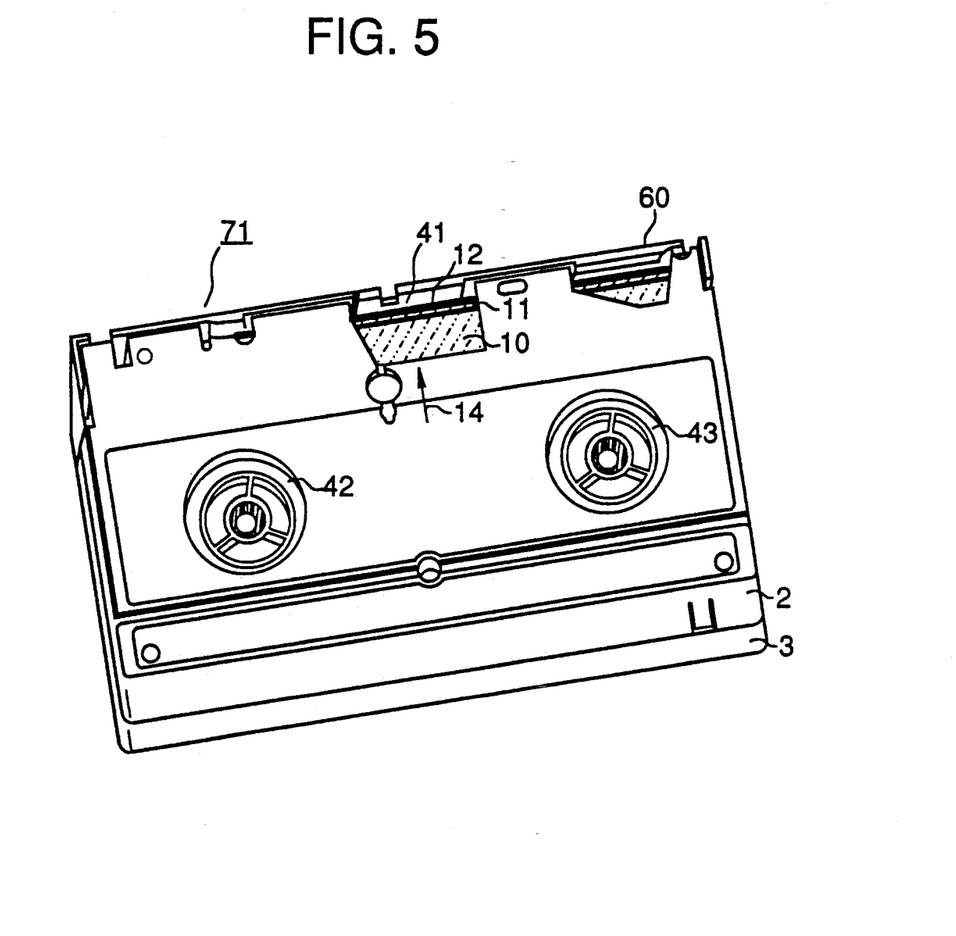
FIG. 5 illustrates the perspective view in the direction of the rear side of a video tape cassette.

FIGS. 4 through 5 illustrate each an example 71 of a video-tape cassette storing such a tape 41 as described above, according to this invention Nos. 5 through 7 and No. 10.

To be more concrete, in this example, the cassette was so constituted as to stick the lower half 2 of the cassette and the upper half 3 thereof together, wherein the lower half 2 stored reel hubs 42, 43 (which were the tape reels) each having a pair of the left and right lower flanges 45, 46 around which any image signal unrecorded raw magnetic tape 41 was wound and the upper half 3 fixed with leaf-spring 55 for holding each of the reel hubs with pressure. In the area of the reel hubs applied with a pressure by leaf-spring 55, small extrusions so-called pivots 52, 53 were put in the central portions of transparent reel flanges 47, 48, so that leaf-spring 55 could be coupled to the pivots, respectively. In the figures, 49 and 50 indicate a pair of the left and right transparent windows.

The infesting circulations of pirated editions can be forbidden by the above-mentioned tape cassettes, when a specific (soft) information is recorded in advance in the cassettes in accordance with the invention Nos. 8 through 11 and they are then marketed. It is also allowed that the tape cassettes of this example are sold as the raw tapes to the specified traders and the above-mentioned information is then recorded by the traders.

As described in FIG. 1, when a specific signal is recorded on tape 41 and thereby a video-tape cassette is provided, the video-tape cassette can be discriminated whether it was pirated or not by checking up whether the colors seen from directions 13, 14 were different from each other or not.

Particularly as shown in FIG. 5, when looking in on the rear side of tape 41 (that is, on the side of support 10) in the direction of arrow mark 14 from the rear side of cassette 71 (that is, from the side of the lower half), the color can readily be discriminated. When the color is different from the color on the side of magnetic layer 12, the pirated edition can readily be discriminated.

Further, the specific surface resistance can be lowered to be not higher than $1.0 \times 10^{10}$ Ω/square. Therefore, the drop-out level and running durability can also be improved.

Next, the following concrete examples of the tape and tape cassette each based on the invention will now be more detailed.

The following components, proportions and operational orders can be varied without departing the spirit of the invention. In the following examples, the term, 'part' or 'parts', shall mean 'a part by weight' or parts by weight.

Based on the invention Nos. 1 to 3, a magnetic layer and a non-magnetic colored layer were each formed on a support that was a 14.0 μm-thick polyethylene terephthalate film base, in the following manner.

| (Composition of magnetic paint I) | |
|---|---|
| Ferromagnetic powder, Co-γ-Fe$_2$O$_3$, (Hc: 800 Oe, Specific surface area: 45 m$^2$/g) | 100 parts |
| α-Al$_2$O$_3$ | 5 parts |
| A metal sulfonate-containing vinyl chloride type resin, (MR100 produced by Japan Zeon Co.) | 10 parts |
| A metal sulfonate-containing polyester polyurethane resin, (UR8700 produced by Toyobo Corp.) | 5 parts |
| Carbon black | 1 part |
| Myristic acid | 1 part |
| Stearic acid | 1 part |
| Butyl stearate | 1 part |
| Cyclohexanone | 100 parts |
| Methylethyl ketone | 100 parts |
| Toluene | 100 parts |

The magnetic paint was prepared by kneading and dispersing the above-given magnetic paint components and then by adding 5 parts of Colonate L produced by Japan Polyurethane Industrial Co.

(Composition of magnetic paint II)

Magnetic paint II was prepared in the same manner as in magnetic paint I, except that the ferromagnetic powder of magnetic paint I was replaced by ferromagnetic metal powder, Fe (Hc: 1500 Oe, specific surface area: 55m$^2$/g).

| (Composition of the paint for non-magnetic colored layer) | |
|---|---|
| Pigment (See Table-1) | 100 parts |
| A phthalocyanine type blue dye | 3 parts |
| A metal sulfonate-containing vinyl chloride type resin, (MR110 produced by Japan Zeon Co.) | 6 parts |
| A metal sulfonate-containing polyester polyurethane resin, (UR8700 produced by Toyobo Corp.) | 3 parts |
| Cyclohexanone | 30 parts |
| Methyl ethyl ketone | 30 parts |
| Toluene | 30 parts |

The paint for a non-magnetic colored layer was prepared by kneading and dispersing the above-given paint components.

The ½ inch-wide or 8 mm-wide sample tapes were each prepared by making use of each of the above-prepared paints and then by coating the layers having the layer structures shown in the following Table-1 on a 14.0 μm-thick support in a wet-on-wet coating method.

TABLE-1

| Magnetic paint | Pigment | *2Layer thickness (μm) |
|---|---|---|
| | Inventive example | |
| 1 I | Tin oxide-coated zinc oxide | 2.2/1.5 |
| 2 I | Tin oxide-coated barium sulfate | 2.2/1,5 |
| 3 I | Tin oxide-coated titanium oxide | 2.2/1.5 |
| 4 I | Antimony solid-solution type tin oxide-coated titanium oxide | 2.2/1.5 |
| 5 II | Antimony solid-solution type tin oxide-coated titanium oxide | 2.2/1.5 |
| 6 *1II/I | Antimony solid-solution type tin oxide-coated titanium oxide | 0.6/1.6/1.5 |
| | Comparative example | |
| 1 I | — | 4.0/- |
| 2 I | Zinc oxide | 2.2/1.5 |
| 3 I | Barium sulfate | 2.2/1.5 |
| 4 I | Titanium oxide | 2.2/1.5 |
| 5 II | — | 4.0/- |
| 6 II | Titanium oxide | 2.2/1.5 |

*1The example in which magnetic paint II was used in the upper layer and magnetic paint I in the lower layer, respectively.
*2The dried layer thicknesses expressed by the combination unit of a magnetic layer/a non-magnetic colored layer or a magnetic layer (the upper layer)/a magnetic layer (the lower layer)/a non-magnetic colored layer.

Next, according to the invention No. 4, the foregoing transparent conductive layer was vacuum evaporated or coated on a 14.0 μm-thick polyethylene terephthalate support. (In Example 11, however, magnetic paint I, the paint for transparent conductive layer (2) and magnetic paint II were each coated so as to make the three layers in a wet-on-wet coating method.) The relations among the magnetic paints, the kinds of the transparent conductive layers and the layer thicknesses are shown in Table-2. (in the table, the numbers of these items are corresponded to the numbers of the transparent conductive layers)

TABLE-2

| Example | Magnetic paint | *2Non-magnetic colored layer | Transparent conductive layer | *1Layer thickness (μm) |
|---|---|---|---|---|
| 7 | I | (1) | (1) | 2.2/1.5/0.1 |
| 8 | I | (1) | (2) | 1.7/1.5/0.5 |
| 9 | I | (1) | (3) | 1.2/1.5/1.0 |
| 10 | II | (1) | (3) | 1.2/1.5/1.0 |
| 11 | II/I | (1) | (3) | 0.6/1.6/1.0/1.0 |

*1The dried layer thicknesses expressed by the combination unit of a magnetic layer/a non-magnetic colored layer/a transparent conductive layer or a magnetic layer (the upper layer)/a transparent conductive layer/a magnetic layer (the lower layer)/a non-magnetic colored layer, (provided, however, the layer thicknesses of transparent conductive layers (1) are expressed by the vacuum evaporated layer thicknesses.)

*2In the non-magnetic colored layer: The same paint as that for the non-magnetic colored layer was used, except that 100 parts of the pigment thereof was replaced by titanium oxide.

Next, the colors of the tapes shown in Tables-2 and -3 were measured from each of the front and rear sides by making use of a color analyzer (Model CMS-1200 produced by Murakami Chromatic Color Co.). Thereby L*, a* and b* were obtained and the color difference each of the ΔE* was calculated out. [For the details, refer to the color specification system recommended by CIE (standing for Commission Internationale de l'Eclairage) in 1976. ] The results thereof are shown in Table-3.

TABLE-3

| | L* | a* | b* | ΔE* | ΔE*(rear)-ΔE*(front) |
|---|---|---|---|---|---|
| Inventive Example | | | | | |
| 1(front) | 19.7 | −0.4 | −2.8 | 19.9 | 51.4 |
| 1(rear) | 49.5 | −33.1 | −39.2 | 71.3 | |
| 2(front) | 19.7 | −0.4 | −2.8 | 19.9 | 53.6 |
| 2(rear) | 53.1 | −35.5 | −36.3 | 73.5 | |
| 3(front) | 19.7 | −0.4 | −2.8 | 19.9 | 53.6 |
| 3(rear) | 53.1 | −35.5 | −36.3 | 73.5 | |
| 4(front) | 19.7 | −0.4 | −2.8 | 19.9 | 53.6 |
| 4(rear) | 53.1 | −35.5 | −36.3 | 73.5 | |
| 5(front) | 16.1 | −0.9 | −3.0 | 16.4 | 57.1 |
| 5(rear) | 53.1 | −35.5 | −36.3 | 73.5 | |
| 6(front) | 16.1 | −0.9 | −3.0 | 16.4 | 57.1 |
| 6(rear) | 53.1 | −35.5 | −36.3 | 73.5 | |
| 7(front) | 19.7 | −0.4 | −2.8 | 19.9 | 53.6 |
| 7(rear) | 53.1 | −35.5 | −36.3 | 73.5 | |
| 8(front) | 19.7 | −0.4 | −2.8 | 19.9 | 53.6 |
| 8(rear) | 53.1 | −35.5 | −36.3 | 73.5 | |
| 9(front) | 19.7 | −0.4 | −2.8 | 19.9 | 53.6 |
| 9(rear) | 53.1 | −35.5 | −36.3 | 73.5 | |
| 10(front) | 16.1 | −0.9 | −3.0 | 16.4 | 57.1 |
| 10(rear) | 53.1 | −35.5 | −36.3 | 73.5 | |
| 11(front) | 16.1 | −0.9 | −3.0 | 16.4 | 57.1 |
| 11(rear) | 53.1 | −35.5 | −36.3 | 73.5 | |
| Comparative Example | | | | | |
| 1(front) | 19.7 | −0.4 | −2.8 | 19.9 | 2.7 |
| 1(rear) | 22.4 | −0.3 | −3.2 | 22.6 | |
| 2(front) | 19.7 | −0.4 | −2.8 | 19.9 | 53.6 |
| 2(rear) | 53.1 | −35.5 | −36.3 | 73.5 | |
| 3(front) | 19.7 | −0.4 | −2.8 | 19.9 | 53.6 |
| 3(rear) | 53.1 | −35.5 | −36.3 | 73.5 | |
| 4(front) | 19.7 | −0.4 | −2.8 | 19.9 | 53.6 |
| 4(rear) | 53.1 | −35.5 | −36.3 | 73.5 | |
| 5(front) | 16.1 | −0.9 | −3.0 | 16.4 | 0.4 |
| 5(rear) | 15.6 | −0.7 | −3.5 | 16.0 | |
| 6(front) | 16.1 | −0.9 | −3.0 | 16.4 | 57.1 |
| 6(rear) | 53.1 | −35.5 | −36.3 | 73.5 | |

With each of the video cassettes prepared upon storing therein a tape, the specific surface resistances, drop-outs, electromagnetic conversion characteristics and running durabilities thereof were measured in the following manners. The results of the measurements are shown in Table-4.

(a) Specific surface resistance

The ½ inch-wide tapes and the 8 mm-wide tapes were each sandwiched between a pair of ½ inch-wide electrodes and a pair of 8 mm-wide electrodes and were then applied each with a load and a voltage of 500 V to both ends, so that the resulting electric resistances were each measured, respectively.

(b) Drop-out (D/O)

An out-put was regarded as a single drop-out when the output was not shorter than 15 μsec and was also lowered by not less than 20 dB in the Rf envelope output and the drop-outs were then measured in the whole length of each tape by making use of a drop-out counter Model VC-5M produced by Japan Victor Co., so that the average number of the resulting drop-outs per minute was obtained. (The measurement unit: the numbers of drop-outs/minute)

(c) RF out-put and Lumi S/N

The values were measured by making sue of a color video noise meter 'Shibasoku 925 D/1' and a deck Model 'HR-S7000' produced by Japan Victor Co., the resulting values were expressed by the values relative to those of the reference tape. (and so forth on).

The frequencies of each signal were as follows.
RF-output: 6 MHz (7 MHz on 8 mm tapes)
Lumi-S/N: 6 MHz (7 MHz on 8 mm tapes)

(d) Running durability

After each 120- minute tape cassette was recorded for first two hours at 20° C. and 60% RH by making use of Model RH-S6000 (produced by Japan Victor Co.), the rewinding and replaying were repeated 1000 times and the running troubles were then checked up in the course of running tapes.

TABLE-4

| | Specific surface resistance (Ω/square) | D/O (No./min) | RF-output (dB) | Lumi-S/N (dB) | Running durability |
|---|---|---|---|---|---|
| Inventive Example | | | | | |
| 1 | 9.0 × 10⁹ | 15 | 0.3 | 0.4 | ○ |
| 2 | 6.0 × 10⁹ | 16 | 0.3 | 0.3 | ○ |
| 3 | 6.0 × 10⁹ | 17 | 0.3 | 0.3 | ○ |
| 4 | 5.0 × 10⁸ | 10 | 0.4 | 0.4 | ○ |
| 5 | 7.0 × 10⁷ | 20 | 0.5 | 0.4 | ○ |
| 6 | 4.0 × 10⁸ | 17 | 0.6 | 0.5 | ○ |
| 7 | 1.0 × 10⁸ | 7 | 0.4 | 0.5 | ○ |
| 8 | 4.0 × 10⁹ | 15 | 0.3 | 0.4 | ○ |
| 9 | 6.0 × 10⁸ | 9 | 0.5 | 0.4 | ○ |
| 10 | 9.0 × 10⁷ | 25 | 0.4 | 0.4 | ○ |
| 11 | 3.0 × 10⁸ | 21 | 0.5 | 0.5 | ○ |
| Comparative Example | | | | | |
| 1 | 5.0 × 10¹³ | 75 | 0 | 0 | X |
| 2 | 8.0 × 10¹² | 60 | 0.1 | 0.2 | Δ |
| 3 | 7.0 × 10¹² | 67 | 0.1 | 0.2 | Δ |
| 4 | 5.0 × 10¹² | 35 | 0.1 | 0.2 | Δ |
| 5 | 9.0 × 10¹¹ | 130 | 0 | 0 | X |
| 6 | 2.0 × 10¹¹ | 70 | 0.1 | 0.2 | Δ |

Results marked by
○ Excellent
Δ Bends found in a part of tape edges
X Serious bends found on tape edges, or stopped in running.

From the above-given results, it was proved that, when a tape and a tape cassette are prepared according to the invention, they can can reduce drop-outs and display an excellent running durability, because they have a substantially low specific surface resistance such as $1.0 \times 10^{10}$ Ω/square. It that the color shades which every pigment inherently have cannot be spoiled, because the conductive coated layers of every conductive pigment or every conductive layer are each transparent. It is, therefore, possible to provide the products which can hardly be imitated and to readily discriminate any pirated editions, because of the color difference between the non-magnetic colored layers and the magnetic layers thereof.

About the color difference $\Delta E^*$ shown in Table-3, it is advisable to make the difference between the rear side of a tape and the front side thereof to be not less than 5.0, desirably not less than 10.0 and, preferably not more than 100.0.

The examples of the invention have been described as above. It is, however, allowed to modify the above-given examples variously based on the technical ideas of the invention. For instance, a high performance duplex magnetic layer type magnetic disk capable of reducing its specific surface resistance can be manufactured when the constitutions of the invention are applied thereto. When making use of the pigments having various color shades as the pigments for the non-magnetic colored layer of this magnetic disk, the color of the disk can be discriminated from the colors of other magnetic disks by seeing the color through the transparent magnetic layer and therefore, every pirated editions (or, every illegally copied software) can be detected, because any carbon black may neither be reduced from nor added at all into the magnetic layer so as to lower the specific surface resistance, although the non-magnetic colored layer cannot be seen through the support.

What is claimed is:

1. A magnetic recording medium which comprises;
   (a) a support;
   and provided thereon, in sequence
   (b) a non-magnetic layer having a thickness of 0.5 to 6 $\mu$m and containing an electrically conductive coated pigment, said pigment being coated with a compound selected from the group consisting of tin oxide and an antimony solid solution type tin oxide,
   (c) a magnetic layer, wherein the specific surface resistance of the magnetic layer is not more than $1.0 \times 10^{10}$ $\Omega$/square, and
   (d) said magnetic layer and said non-magnetic layer are formed by a wet-on-wet method.

2. The magnetic recording medium of claim 1, wherein said conductive pigment has a particle size within the range of 0.1 $\mu$m to 10 $\mu$m.

3. The magnetic recording medium of claim 1 wherein a transparent electrically conductive layer is further provided among said support, said magnetic layer and said non-magnetic layer.

4. The medium of claim 1 wherein said surface resistance is not more than $5.0 \times 10^9$ $\Omega$/square.

5. The medium of claim 1 wherein said pigment is a metal oxide.

6. The medium of claim 5 wherein said metal oxide is selected from the group consisting of zinc oxide, barium sulfate, and titanium oxide.

7. A magnetic recording medium cassette comprising a cassette case containing the recording medium of claim 1.

8. The magnetic recording medium cassette of claim 7, wherein a transparent electrically conductive layer is further provided between said support and a surface opposite to said support of said magnetic layer.

9. The magnetic recording medium cassette of claim 7 wherein said non-magnetic layer is tinted in different color from that of said magnetic layer, whereby said magnetic recording medium cassette can be discriminated as to whether it is a pirated edition of not.

* * * * *